(12) United States Patent
Izzo et al.

(10) Patent No.: US 10,563,631 B2
(45) Date of Patent: Feb. 18, 2020

(54) FILTER ASSEMBLY AND FUEL INJECTOR

(71) Applicant: Continental Automotive GmbH, Hannover (DE)

(72) Inventors: Ivano Izzo, Pisa (IT); Cedric Louis Adrien Leger-Cartier, Capannoli (IT); Gianluigi Manzo, Pisa (IT); Luca Matteucci, Pisa (IT); Marco Mechi, Vada (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 234 days.

(21) Appl. No.: 15/120,636

(22) PCT Filed: Feb. 9, 2015

(86) PCT No.: PCT/EP2015/052649
§ 371 (c)(1),
(2) Date: Aug. 22, 2016

(87) PCT Pub. No.: WO2015/124452
PCT Pub. Date: Aug. 27, 2015

(65) Prior Publication Data
US 2017/0009724 A1 Jan. 12, 2017

(30) Foreign Application Priority Data
Feb. 20, 2014 (EP) .................................. 14155909

(51) Int. Cl.
*F02M 61/16* (2006.01)
*B01D 35/00* (2006.01)
(Continued)

(52) U.S. Cl.
CPC ........... *F02M 61/165* (2013.01); *B01D 29/31* (2013.01); *B01D 35/005* (2013.01); *B01D 35/30* (2013.01);
(Continued)

(58) Field of Classification Search
CPC .. B01D 2201/02; B01D 29/31; B01D 35/005; B01D 35/30; F02M 2200/27; F02M 61/165; F02M 61/168
See application file for complete search history.

(56) References Cited

U.S. PATENT DOCUMENTS

| | | | |
|---|---|---|---|
| 6,012,655 A | 1/2000 | Maier | 239/585.4 |
| 6,328,232 B1 | 12/2001 | Haltiner, Jr. et al. | 239/585.1 |

(Continued)

FOREIGN PATENT DOCUMENTS

| | | | |
|---|---|---|---|
| CN | 1198199 A | 11/1998 | F02M 51/06 |
| EP | 1219815 A1 | 7/2002 | F02M 51/06 |

(Continued)

OTHER PUBLICATIONS

European Search Report, Application No. 14155909.6, 5 pages, dated May 13, 2014.
(Continued)

*Primary Examiner* — Dirk R Bass
(74) *Attorney, Agent, or Firm* — Slayden Grubert Beard PLLC

(57) ABSTRACT

The present disclosure relates to filters in general, and the teachings may be applied to a filter assembly for use in a fuel injector, the fuel injector, and internal combustion engines. A filter assembly may include: a filter element with a frame having an axial end and a tubular filter housing receiving the filter element. The filter housing may have a side wall with a taper supporting the axial end. The taper may have the shape of a conic section with an opening angle γ of less than 180°. The outer circumferential surface of the frame may include a first section in the section of the taper having the shape of a conic section with an opening angle α of less than 180°.

16 Claims, 4 Drawing Sheets

(51) Int. Cl.
  *B01D 35/30* (2006.01)
  *B01D 29/31* (2006.01)
(52) U.S. Cl.
  CPC ....... *F02M 61/168* (2013.01); *B01D 2201/02* (2013.01); *F02M 2200/27* (2013.01)

(56) References Cited

U.S. PATENT DOCUMENTS

| | | | |
|---|---|---|---|
| 6,554,139 B1 * | 4/2003 | Maxwell | B01D 29/21 210/435 |
| 6,648,247 B2 * | 11/2003 | McFarland | F02M 51/005 239/533.6 |
| 7,086,606 B2 * | 8/2006 | Brooks | F02M 51/0614 239/5 |
| 7,128,281 B2 * | 10/2006 | Cho | F02M 51/0682 239/585.1 |
| 2003/0052052 A1 * | 3/2003 | Boast | F02M 51/0667 210/429 |
| 2004/0089730 A1 | 5/2004 | Toiyama | 239/5 |
| 2010/0213286 A1 | 8/2010 | Grandi et al. | 239/575 |

FOREIGN PATENT DOCUMENTS

| | | | |
|---|---|---|---|
| EP | 1229239 A2 | 8/2002 | ............. F02M 51/00 |
| JP | 2010529350 A | 8/2010 | ............. F02M 61/16 |
| WO | 2005/001279 A1 | 1/2005 | ............. F02M 51/06 |
| WO | 2015/124452 | 8/2015 | ............. F02M 61/16 |

OTHER PUBLICATIONS

International Search Report and Written Opinion, Application No. PCT/EP2015/052649, 9 pages, dated May 4, 2015.
Korean Office Action, Application No. 2017089296974, 14 pages, dated Dec. 20, 2017.
Chinese Office Action, Application No. 201580009591.1, 18 pages, dated May 3, 2018.
Korean Notice of Allowance, Application No. 2018047602824, 3 pages, dated Jul. 13, 2018.

* cited by examiner

FILTER ASSEMBLY AND FUEL INJECTOR

CROSS-REFERENCE TO RELATED APPLICATIONS

This application is a U.S. National Stage Application of International Application No. PCT/EP2015/052649 filed Feb. 9, 2015, which designates the United States of America, and claims priority to EP Application No. 14155909.6 filed Feb. 20, 2014, the contents of which are hereby incorporated by reference in their entirety.

TECHNICAL FIELD

The present disclosure relates to filters in general, and the teachings may be applied to a filter assembly for use in a fuel injector, the fuel injector, and internal combustion engines.

BACKGROUND

A combustion engine, especially of the piston type, uses a fuel injector for injecting fuel into a combustion chamber. The fuel injector typically comprises a filter assembly that is commonly press-fitted into the injector in an axial direction during manufacturing the injector.

EP 1 229 239 A2 shows a fuel injector with a filter.

As the filter assembly is press-fitted into the injector, considerable forces may act on the filter assembly so that the position of the filter assembly with respect to the injector may be poorly defined due to deformations that may occur. In addition, a rupture of the filter element may occur so that unfiltered fuel may pass towards the delicate valve system of the injector.

SUMMARY

The teachings of the present disclosure may be applied to a filter assembly and a fuel injector so that axial press fitting the filter assembly into the injector may be carried out with reduced risk of deformation of an element of the filter assembly.

In some embodiments, a filter assembly (110) for use in a fuel injector (100) for injecting fuel into a combustion engine, the assembly (110) may comprise: a filter element (165) with a frame (180), the frame (180) having an axial end (220); a tubular filter housing (170) in which the filter element (165) is received; the filter housing (170) having a side wall with a taper (305) supporting the axial end (220) of the frame (180) of the filter element (165), wherein the taper (305) has the shape of a conic section, based on a cone with an opening angle $\gamma$ of less than 180° and an outer circumferential surface of the frame (180) comprises a first section (320) in the section of the taper (305), the first section (320) having the shape of a conic section, based on a cone with an opening angle $\alpha$ of less than 180°.

In some embodiments, $60° \leq \alpha \leq 160°$.

In some embodiments, the outer circumferential surface of the frame (180) further comprises a second section (330) in the region of the taper (305), the second section (330) having the shape of a conic section, based on a cone with an opening angle $\beta$ of less than 180° and $\alpha \neq \beta$.

In some embodiments, $20° \leq \beta \leq 140°$.

In some embodiments, $\alpha > \gamma > \beta$.

In some embodiments, $h \leq y \leq H$, with
h:=an axial height of the first section (320)
y:=an axial height of the taper (305) and
H:=an accumulated axial height of the first and second sections (320, 330).

In some embodiments, the filter assembly (110) is configured to be axially press-fitted into the injector (100).

In some embodiments, a fuel injector (100) comprises a filter assembly (110) as described above.

BRIEF DESCRIPTION OF THE DRAWINGS

The invention will now be explained in more detail with respect to the enclosed drawings, in which.

DETAILED DESCRIPTION

Figure 1:
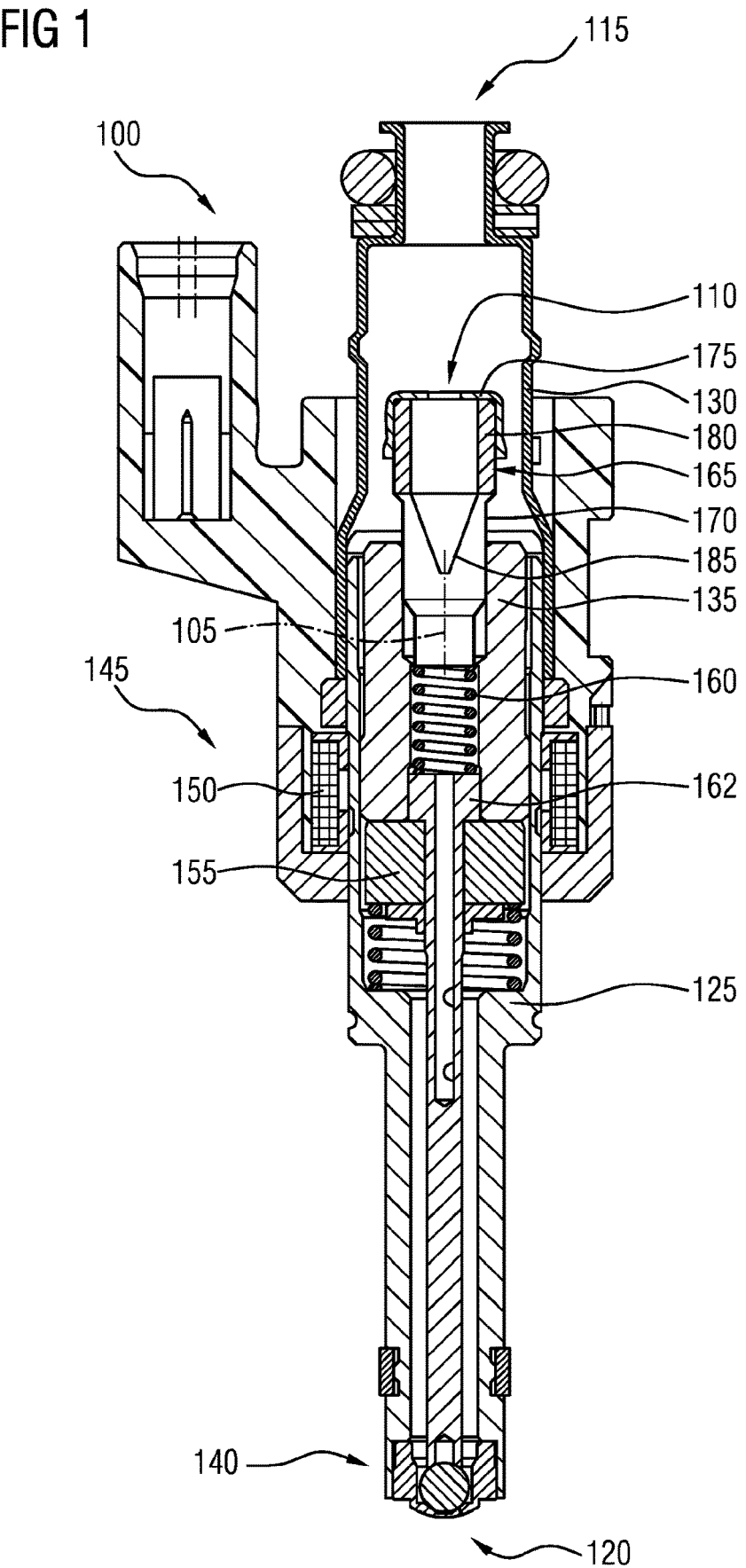
FIG. 1 shows a fuel injector in a longitudinal section view, according to teachings of the present disclosure.

According to the teachings of the present disclosure, a filter assembly for an injector for injecting fuel into a combustion engine may comprise a filter element and a tubular filter housing in which the filter element is received. A fuel injector may comprise the filter assembly described herein.

In some embodiments, the filter element has a frame. It may further have a filter screen which is attached to the frame. In some embodiments, the frame has a cylindrical side wall, in particular extending along a longitudinal axis. In other embodiments, the frame has a central opening which extends through the frame along the longitudinal axis, the central opening having radial protrusions. An outer circumferential side surface of the frame may be cylindrical also in these embodiments.

In some embodiments, the filter screen protrudes from one side—in particular a fuel outlet side—of the frame in longitudinal direction. In some embodiments, the filter screen axially overlaps the frame and follows the shape of the central opening of the frame in the region of the axial overlap.

In some embodiments, the filter housing has a side wall with a taper supporting an axial end of the frame of the filter element. The axial end is located at the fuel outlet side of the frame in one embodiment. The taper has the shape of a conic section, based on a cone with an opening angle $\gamma$ of less than 180°. In particular, a cross-sectional area of an inner circumferential surface of the filter housing decreases gradually in the region of the taper in the course along the longitudinal axis. In some embodiments, the filter screen protrudes longitudinally beyond the conic section.

By using the sloped surface of the conic section rather than a shoulder, axial forces upon the filter assembly during press-fitting the filter assembly into the fuel injector can be better sustained and deformation of the filter housing can be prevented or at least largely avoided.

Adjacent to the above mentioned axial end, the outer circumferential side surface of the frame may comprise a first section in the region of the taper, the first section having the shape of a conic section, based on a cone with an opening angle $\alpha$ of less than 180°.

The first section may for instance be aligned with the taper—i.e. in particular the first section and the taper overlap axially. In this way, the filter assembly may be free of sharp edges that may exercise tension onto the filter housing in the taper section. In cases where the opening angle α differs from the opening angle γ, the frame may be made from an elastic material, so that the first section of the outer circumferential surface of the frame may be deformed to adapt to the inner circumferential surface of the filter housing in the region of the taper during assembling the filter assembly. In this way, an improved radial support of the frame may be provided.

In some embodiments, the opening angle α lies between 60° and 160°. Experiments have shown that a chamfer of this inclination is well-suited to both transfer axial forces and give radial support to the filter housing.

In some embodiments, the outer circumferential surface of the frame may further comprise a second section in the region of the taper, the second section having the shape of a conic section, based on a cone with an opening angle β of less than 180° and α≠β. The second section may be also arranged adjacent to the above mentioned axial end of the frame. In particular, the first section and the second section adjoin one another, i.e. they follow one another directly and have a common interface.

In some embodiments, the first section may be arranged subsequent to the second section in longitudinal direction along the frame towards the axial end and in particular towards the fuel outlet side. The second section may lie axially between the first section and a cylindrical section of the outer circumferential side surface of the frame. By providing the two adjacent sections, adaptation of the filter element to the filter housing or force transfer between filter element and filter housing may be further improved.

In some embodiments, the opening angle β lies between 20° and 140°. In some embodiments, α is greater than γ and γ is greater than β.

In some embodiments, an axial height h of the first section is smaller than or equal to an axial height y of the taper and the axial height y of the taper is smaller than or equal to an accumulated axial height H of the first and second sections. Both, the first and second section overlap in particular axially with the taper. This way, the interface of the first and second sections may be positioned on the taper of the filter housing.

In some embodiments, the filter assembly is configured to be axially press-fitted into the injector. For example, an outer diameter of the filter housing on the smaller diameter end of the taper may be aligned with an inner diameter of a bore of a supporting part of the injector. The filter assembly may thus be press-fitted into the injector such that an axial position of the filter assembly can be calibrated while no physical damage may occur to the filter housing during this process. Especially in an injector where the axial position of the filter element determines a characteristic of the injector, such as a flow rate, a filter assembly described above can be used with advantage.

FIG. 1 shows an example fuel injector 100 for injecting fuel into a combustion engine, especially in a power train of a motor vehicle. The fuel injector 100 extends along a longitudinal axis 105 and comprises a filter assembly 110 for filtering fuel on its way through the injector 100 between an inlet 115 and a tip 120. The filter assembly 110 may also extend along the longitudinal axis 105.

In some embodiments, fuel injector 100 may include a valve 140 for controlling a flow of fuel through the tip 120 and an electromagnetic actuator 145 for operating the valve 140. The actuator 145 may comprise a solenoid 150 and an armature 155. When the solenoid 150 is energized it attracts the armature 155 which is coupled to the valve 140 so that a flow of fuel through the injector 100 is permitted.

In the present, exemplary embodiment the fuel injector 100 furthermore comprises a body 125, a cover 130 and a block 135. The block 135 is in particular a pole piece of the actuator 145 of the fuel injector 100. The block 135 is adapted to receive the filter assembly 110 from an axial direction and the filter assembly 110 is preferred to be adapted for press-fitting into the block 135. In particular, the block 135 has a central bore extending through the block 135 in longitudinal direction and the filter assembly 110 is received in the central bore.

A calibration spring 160 pushes a valve needle 162 of the valve 140 towards a valve seat of the valve 140 in a direction opposite to the attraction force of the solenoid 150 when energized. In present embodiment, the filter assembly 110 is in contact with the calibration spring 160 on an axial side opposite to the side on which the calibration spring 160 is in contact with the valve needle 162. The preloading force of the calibration spring 160 on the valve needle 162 may be adjusted by changing the axial position of filter assembly 110 with respect to block 135. Through this, dynamic flow characteristics of the injector 100 may be calibrated. Such calibration may be performed during manufacturing the injector 100.

In some embodiments, the filter assembly 110 comprises a filter element 165, a filter housing 170 and a filter cap 175. The filter element 165 has a cylindrical frame 180, to which a filter screen 185 is attached for filtering fuel which flows through the injector 100 to the valve 140.

The frame 180 may be hollow. It may have the shape of a cylinder shell. In other embodiments the inner lateral surface of the frame 180 is not cylindrical. In this way, a particularly large filtering area of the filter screen 185 is achievable. The frame 180 is by preference manufactured from a plastic, in particular by means of moulding or casting.

The screen 185 may comprise a fine sieve, a fleece or the like. It axially protrudes beyond a first axial end 220 of the frame 180 on a fuel outlet side of the frame 180. The screen 185 may be moulded to the frame 180 in the same or a successive process, for example by means of insert moulding.

In some embodiments, the filter housing 170 may be a metal part, for instance manufacturable from a metal sheet by deep-drawing.

The cap 175 may also comprise a formed sheet metal. The cap 175 may be press-fitted onto the filter housing 170. It is preferred that the cap 175 comprises an aperture for permitting a flow of fuel towards the filter element 165. After passing through the filter element 165, the fuel may exit through another aperture in the filter housing 170, near the bottom of filter assembly 110 in FIG. 1, to flow towards the valve 140.

Figure 2:
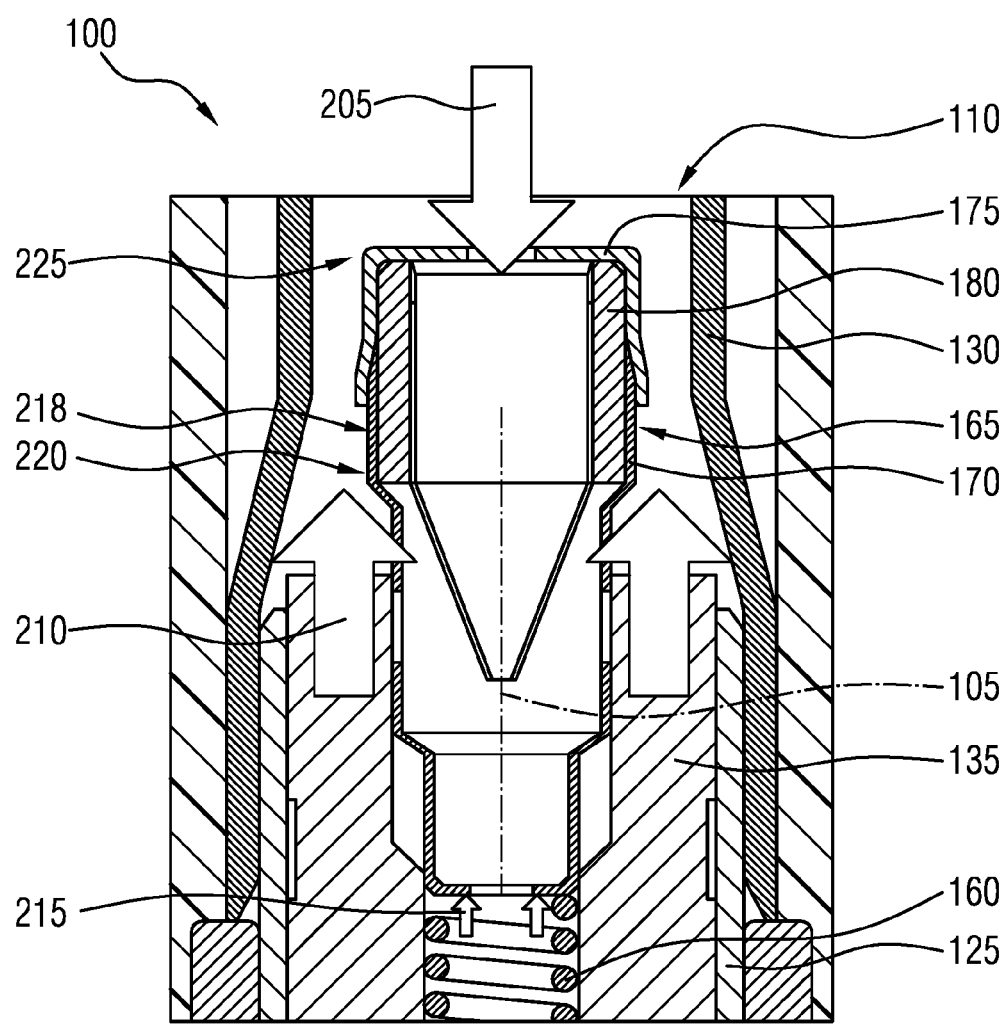
FIG. 2 shows a filter assembly being installed into the fuel injector of FIG. 1 in a longitudinal section view.

FIG. 2 shows the filter assembly 110 during installation in the fuel injector 100 of FIG. 1. A pressing force 205 is exerted to the filter cap 175 from where it may be transferred to the frame 180 of the filter element 165 and on to the filter housing 170. In other embodiments—for example when the filter housing 170 is bent inwards near the filter cap 175 such as to enclose the filter element 165 on its adjacent axial end which is in particular positioned on a fuel inlet side of the frame 180—the pressing force from the filter cap 175 may be forwarded directly into the filter housing 170 without being conducted axially through the frame 180. The pressing force may lie in the range of 200-1000 N or even more.

Lateral friction between the filter housing 170 and the block 135 creates a resisting force 210 acting in a direction opposite to pressing force 205. Furthermore, a preloading force 215 of calibration spring 160 acts on the filter housing 170 against pressing force 205. When the pressing force 205 exceeds the sum of the resisting force 210 and the preloading force 215, the filter assembly 110 is press-fitted further into block 135 of injector 100. The press-fitting of filter assembly 110 may be carried out until a flow rate of a fluid through injector 100 has reached a desired value. The pressing force 205 may be applied continuously or in pulses. When the pressing force 205 is removed, the filter assembly 110 is kept by lateral friction in its position with respect to block 135.

The filter housing 170 has a taper 305 where an inner diameter of the filter housing 170 is reduced downstream the filter cap 175. The frame 180 has a side wall 218 with a generally cylindrical circumferential outer surface, a first axial end 220 near the taper 305 and a second axial end 225 near the cap 175 (see FIG. 2). The first axial end 220 is positioned at a fuel outlet side of the frame 180 and the second axial end 225 is positioned at a fuel inlet side of the frame 180.

The geometry of adjacent surfaces in the area of the taper shall be explained in more detail with reference to FIG. 3. A particularly good transfer of forces along the filter housing 170 in the area of the taper is achievable in this way.

Figure 3:
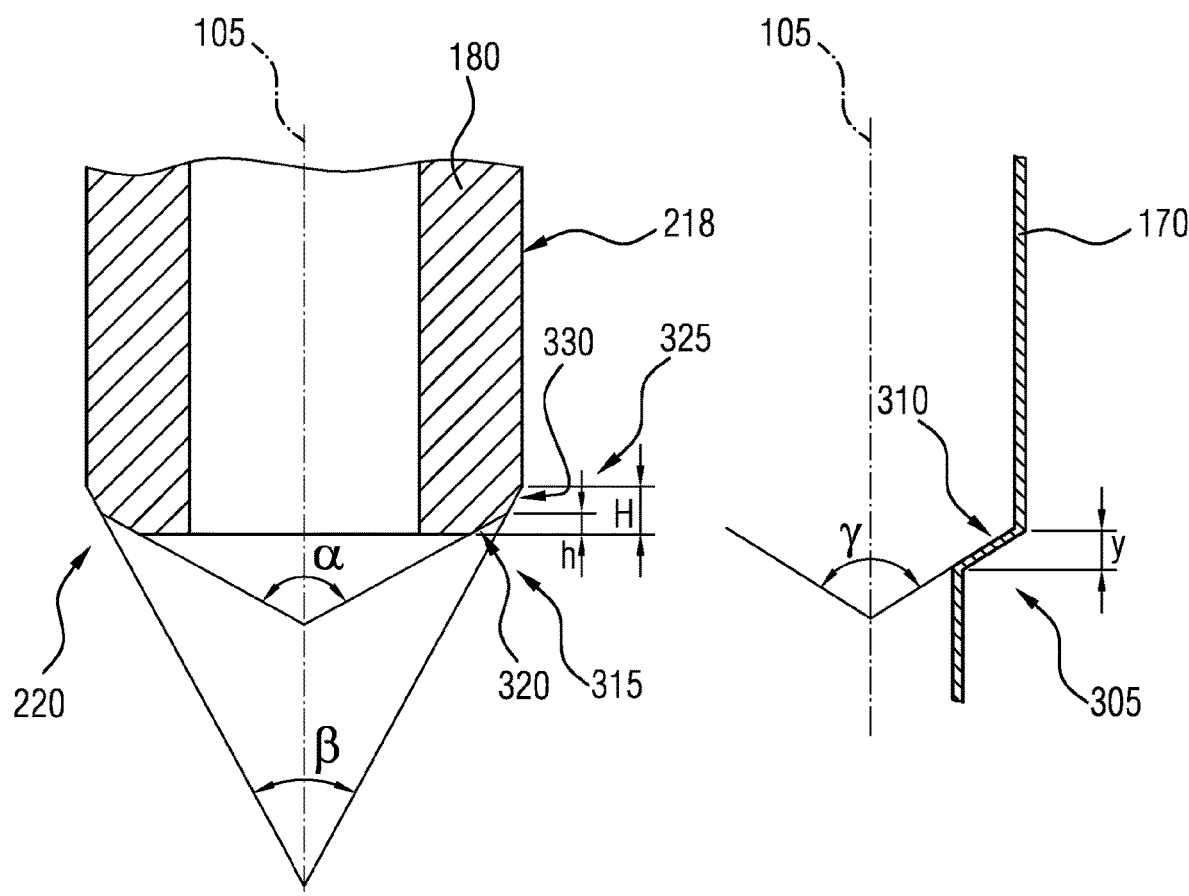
FIG. 3 shows a filter element and a filter housing of a filter assembly for the injector of FIG. 1 in respective longitudinal section views and FIG. 4 shows exemplary embodiments of the filter assembly of FIGS. 1-3 in longitudinal section views.

FIG. 3 shows a filter element 165 and a filter housing 170 of a filter assembly 110 for the injector 100 according to FIG. 1 or 2 in longitudinal section views. On the left hand side, the first axial end 220 of the cylindrical frame 180 of filter element 165 of filter assembly 110 is shown in detail according to one embodiment. On the right hand side, the filter housing 170 with a taper 305 for supporting the axial end 220 of the frame 180 is shown in one embodiment. Only the portion of the filter housing 170 on the right hand side of the longitudinal axis 105 is shown for the sake of simplicity. Dimensions are not to be regarded true to scale for the sake of better representability and/or understanding and may not match those in FIG. 1 or 2.

The filter housing 170 employs a taper 305 to provide a slanted contact surface 310 against which the axial end 220 of frame 180 may rest. The slanted contact surface 310 is a portion of the inner circumferential surface of the filter housing 170. The taper 305 has the shape of a conic section, based on a cone with an opening angle γ which is smaller than 180°. This makes it different from a shoulder, which may be understood as a taper based on a cone with an opening angle of 180°. An extension of contact surface 310 in an axial direction is marked as y.

The frame 180 may have a first chamfer 315 at its first axial end 220 to match with the contact surface 310 of the filter housing 170. The first chamfer 315 creates a first section 320 of the outer circumferential surface of the sidewall 218 of the frame 180 which also has the shape of a conic section, based on a cone with an opening angle α. In this, α is smaller than 180°. An extension of the first surface 320 in axial direction is given as h. In one embodiment, the first section 320 and the contact surface 310 have the same cone angle, i.e. α may equal γ.

There may also be a second chamfer 325, creating a second section 330 of the outer circumferential surface of the sidewall 218 of the frame 180. The second section 330 precedes the first section 320 axially in direction towards the first axial end 220 and, in the present embodiment, has a common interface with the first section 320. Both, the first and second sections 320, 330 overlap axially with the taper 305.

The second section 330, too, has the shape of a conic section, based on a cone with an opening angle of β. When the second chamfer 325 is present, the first surface 320 may have the same cone angle as the contact surface 310 (i.e. α=γ), while β≠γ. In another embodiment, the second surface 330 has the same cone angle as contact surface 310 (i.e. β=γ), while α≠γ. In yet another embodiment, however, α≠β≠γ, and h<y so that firstly, only a narrow circular section where surfaces 320 and 330 meet at their common interface comes in contact with contact surface 310.

An accumulated axial height H comprises the axial height h of the first surface 320 and the axial height of the second surface 330.

Various combinations of the given dimensions may lead to an improved rest of the axial end 220 of frame 180 against the taper 305 of filter housing 170. The following table gives preferred limits for said dimensions. Each specification accords to another preferred embodiment and may be independent of the other given specifications.

|   | minimum | maximum |
|---|---------|---------|
| H | 0.2 mm  | 0.7 mm  |
| h | 0.1 mm  | 0.5 mm  |
| y | h       | H       |
| α | 60°     | 160°    |
| β | 20°     | 140°    |
| γ | α       | β       | with the additional preferred constraints that
h<H; and
α>β.

Figure 4:
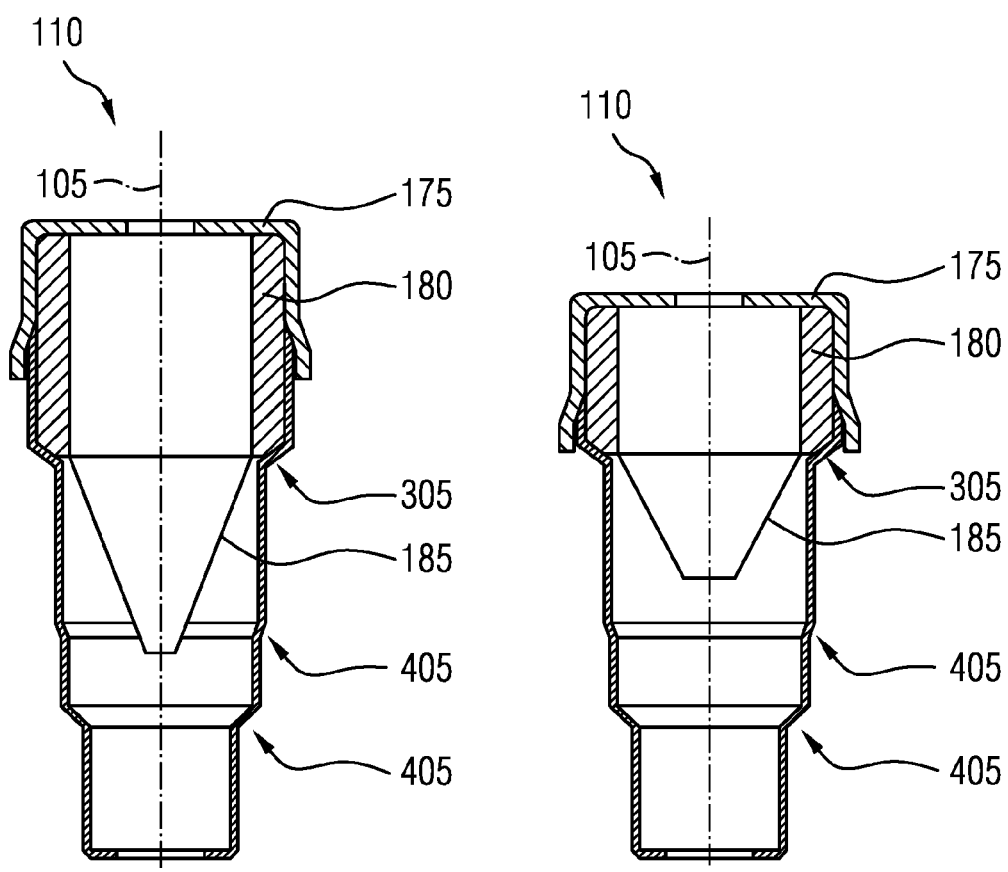

FIG. 4 shows exemplary embodiments of the filter assembly 110 of FIGS. 1 to 3. In addition to the taper 305 there may be further tapers 405 without conflict with the functionality of the first taper 305.

What is claimed is:

1. A filter assembly for use in a fuel injector for injecting fuel into a combustion engine, the filter assembly comprising:
    a filter element with a filter element frame having an axial end;
    a tubular filter housing receiving the filter element including the filter element frame in an axial direction toward a valve needle;
    the filter housing having a side wall with a taper supporting the axial end of the filter element frame of the filter element; and
    wherein the taper has the shape of a conic section, based on a cone with an opening angle γ, facing away from the valve needle, of less than 180°; and
    an outer circumferential surface of the filter element frame, which is received in the tubular filter housing, comprises:
        a first tapered section proximate a distal end of the filter element frame, the first tapered section having the shape of a conic section, based on a cone with an opening angle α, facing away from the valve needle, of less than 180°, and
        a second tapered section having the shape of a conic section, based on a cone with an opening angle β, facing away from the valve needle, that is less than the opening angle α of the first tapered section;
    wherein a transition between the first tapered section and the second tapered section defines a circular transition region that extends circumferentially around the filter element frame.

2. A filter assembly according to claim 1, wherein 60°≤α≤160°.

3. A filter assembly according to claim 1, wherein $20° \leq \beta \leq 140°$.

4. A filter assembly according to claim 1 wherein $\alpha > \gamma > \beta$.

5. A filter assembly according to claim 1, wherein $h \leq y \leq H$, with
   h is an axial height of the first tapered section of the filter element frame outer surface;
   y is an axial height of the filter housing side wall taper; and
   H is a total axial height of the first and second tapered sections of the filter element frame outer surface.

6. A filter assembly according to claim 1, wherein the filter assembly is configured to be axially press-fitted into the injector.

7. A filter assembly for use in a fuel injector for injecting fuel into a combustion engine, the filter assembly comprising:
   a filter element with a filter element frame having an axial end;
   a tubular filter housing receiving the filter element including the filter element frame along in an axial direction toward a valve needle;
   the filter housing having a side wall with a taper supporting the axial end of the filter element frame;
   wherein the filter housing side wall taper has the shape of a conic section, based on a cone with an opening angle $\gamma$, facing away from the valve needle, of less than 180°; and
   wherein the filter element frame includes an outer circumferential surface received in the tubular filter housing and including, proximate the filter housing side wall taper:
      a first tapered section having the shape of a conic section, based on a cone with an opening angle $\alpha$, facing away from the valve needle, of less than 180°; and
      a second tapered section axially adjacent the first tapered section and having the shape of a conic section, based on a cone with an opening angle $\beta$, facing away from the valve needle, wherein $\beta < \alpha$;
      wherein a transition between the second tapered section and the first tapered section define a circular transition region that extends circumferentially around the filter element frame.

8. A filter assembly according to claim 7, wherein $60° \leq \alpha \leq 160°$.

9. A filter assembly according to claim 7, wherein $60° \leq \alpha \leq 160°$.

10. A filter assembly according to claim 7, wherein $20° \leq \beta \leq 140°$.

11. A filter assembly according to claim 7, wherein $\alpha > \gamma > \beta$.

12. A filter assembly according to claim 7, wherein:
    $\alpha > \gamma > \beta$; and
    $h \leq y \leq H$, wherein h is an axial height of the first tapered section of the filter element frame outer surface, and y is an axial height of the filter housing side wall taper, such that only circular transition region of the filter element frame at the transition between the first and second tapered sections of the filter element frame outer surface comes in contact with the filter housing side wall taper.

13. A filter assembly according to claim 7, wherein $h \leq y \leq H$, with
    h:=an axial height of the first tapered section of the filter element frame outer surface;
    y:=an axial height of the filter housing side wall taper; and
    H:=a total axial height of the first and second tapered sections of the filter element frame outer surface.

14. A filter assembly according to claim 1, wherein:
    the outer circumferential surface of the filter element frame has a cylindrical portion located axially upstream from the second tapered section in a direction away from the valve needle; and
    no portion of the outer circumferential surface of the filter element downstream of the first tapered section extends in a radially outward direction.

15. A filter assembly according to claim 7, wherein in an installed position of the filter element, the circular transition region of the filter element frame sits on the filter housing side wall taper.

16. A fuel injector comprising:
    a fuel injector body having an injection opening;
    a valve needle arranged in the fuel injector body;
    an actuator configured to move the valve needle between a first position that blocks the injection opening and a second position that allows fluid flow through the injection opening; and
    a filter assembly configured to filter fuel flowing through the fuel injector, the filter assembly comprising:
       a filter element with a filter element frame having an axial end;
       a tubular filter housing receiving the filter element including the filter element frame in an axial direction toward the valve needle;
       the filter housing having a side wall with a taper supporting the axial end of the filter element frame of the filter element;
       wherein the taper has the shape of a conic section, based on a cone with an opening angle $\gamma$, facing away from the valve needle, of less than 180°; and
       an outer circumferential surface of the filter element frame, which is received in the tubular filter housing, comprises:
          a first tapered section proximate a distal end of the filter element frame, the first tapered section having the shape of a conic section, based on a cone with an opening angle $\alpha$, facing away from the valve needle, of less than 180°, and
          a second tapered section having the shape of a conic section, based on a cone with an opening angle $\beta$, facing away from the valve needle, that is less than the opening angle $\alpha$ of the first tapered section;
          wherein a transition between the first tapered section and the second tapered section defines a circular transition region that extends circumferentially around the filter element frame.

\* \* \* \* \*